United States Patent Office 2,781,167
Patented Feb. 12, 1957

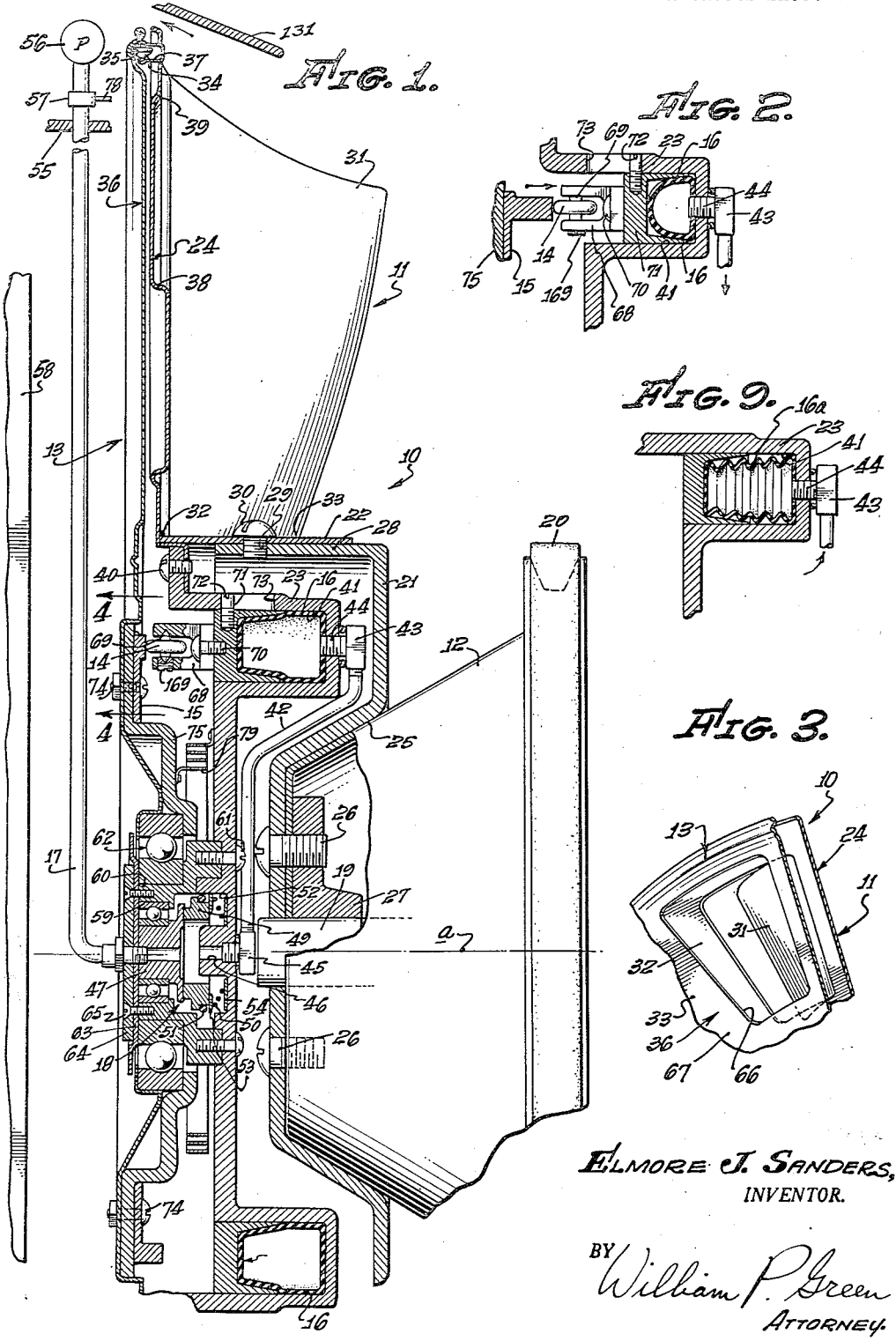

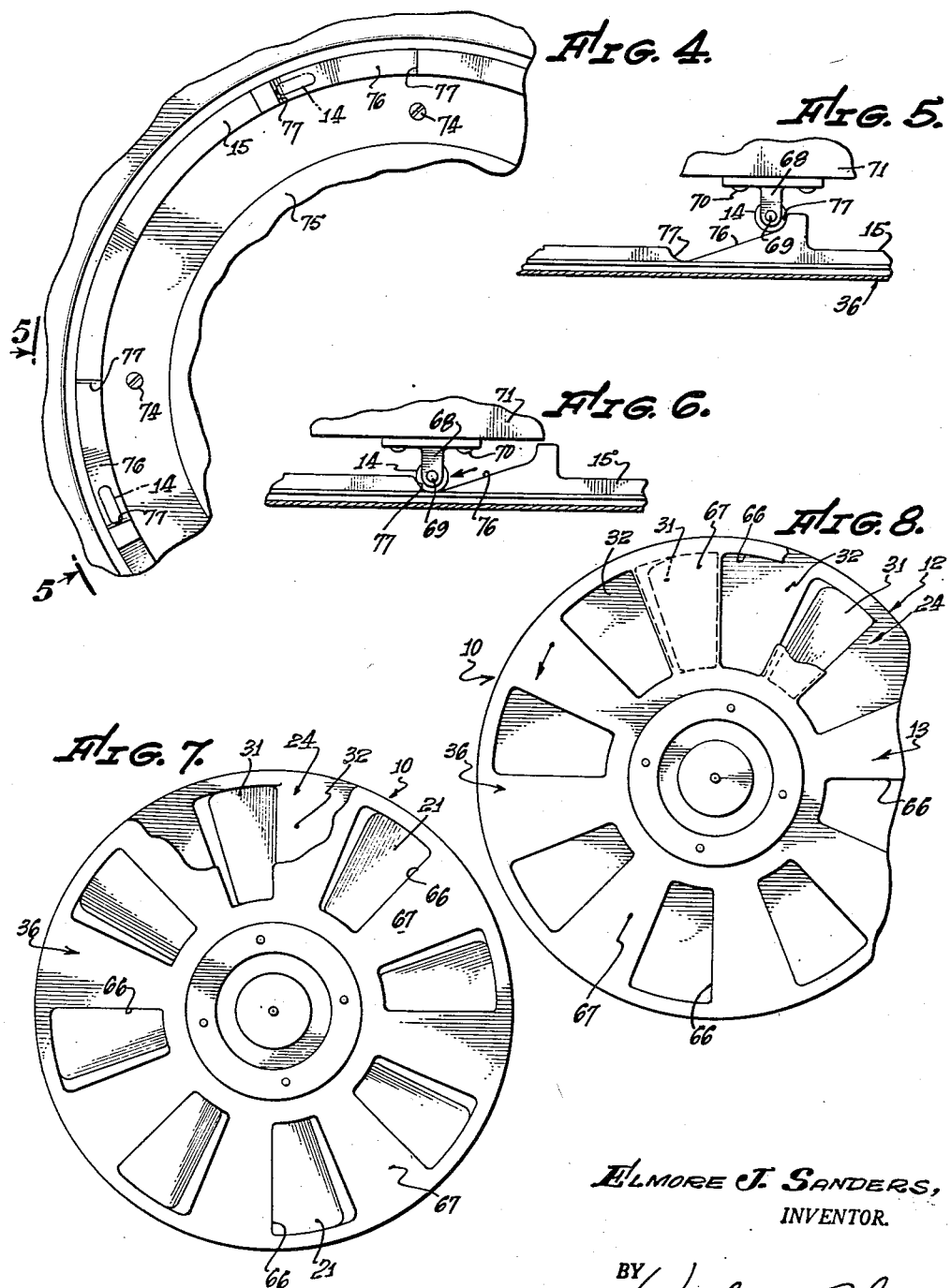

2,781,167

ACTUATING MECHANISM FOR VARIABLE FLOW FLUID DISPLACEMENT ROTOR

Elmore J. Sanders, Orange, Calif.

Application February 28, 1955, Serial No. 490,781

18 Claims. (Cl. 230—270)

This invention relates to improved fluid displacement rotors, including both fan type devices for moving a fluid and turbine like rotors to be driven by a moving fluid. The invention is particularly concerned with improvements in the general type of rotor assembly disclosed in my Patent Number 2,626,743, issued January 27, 1953, for "Air Displacement Rotor."

In the above mentioned patent, I have disclosed a rotor assembly which is so designed as to allow for regulation of the fluid flow through the device while it is rotating. Specifically, the device may be actuated between an open condition for passing fluid relatively freely, and a closed condition in which the normal flow of fluid may be closed off. This flow control is attained by designing the device to include a first vaned section, and a second shutter section which rotates with the vaned section and is adjustable relative thereto while the sections turn. Such adjustment of the shutter section then effects the desired regulation of fluid flow. Preferably, the shutter section is adjusted by rotary movement relative to the vaned section and about the main axis of the device.

The present invention has to do with improved mechanism for relatively adjusting the two sections of such a rotor while the device is turning. An object of the invention is to provide an adjusting mechanism which is very positive in action, and in particular a mechanism which is not rendered inoperative by the centrifugal forces encountered when the device is run at very high speeds. It has been found that many types of adjusting mechanism which are perfectly satisfactory for some low speed uses are undesirable for very high speed applications, by reason of the strong centrifugal forces exerted against the parts of the actuating mechanism when the device turns at high speed.

To attain such positive operation even at high speeds, the adjusting or control mechanism includes a part or parts which move axially of the device, and which control the relative adjustment of the two rotary sections by such axial movement. These parts are moved axially by mechanism which may be rotatable with the device and is desirably adapted for remote control. The entire control mechanism should not include any part which tends as a result of centrifugal force to actuate the axially movable control part. For best results, all parts which turn with the device are restrained against any type of movement other than directly axially, or rotatively about the main axis, or rotatively about an axis extending directly radially with respect to the main axis.

Preferably the device includes a cam element, which may be the previously mentioned axially movable part, and acts when moved to relatively cam or actuate the two sections. This cam element may be a small roller, which is desirably rotatable about an axis extending radially of the main axis. Though the actuating means may in certain instances be operated electrically or mechanically, I have found especially desirable for many installations a fluid pressure type of actuation. This fluid type control may include a pressure operated elastic bladder, preferably disposed annularly about the main axis of the device, and acting by virtue of its pressure controlled expansion and contraction to operate the cam or other positioning member. In this connection, it is noted that where the claims specify that the device is free of any "element" tending to move by centrifugal force in a direction for relatively adjusting the sections, the term "element" or similar term is not intended to include as an "element" the pressure fluid which may be utilized to actuate the mechanism.

The above and other features and objects of the present invention will be better understood from the following detailed description of the typical embodiment illustrated in the accompanying drawing in which:

Fig. 1 is a fragmentary section taken diametrically through an engine cooling fan assembly constructed in accordance with the invention, the parts being shown in their closed shutter positions;

Fig. 2 is a fragmentary view of the cam and actuating mechanism of the device, showing these parts in their open shutter positions;

Fig. 3 is a fragmentary partially diagrammatic perspective view of the fan and shutter parts of the Fig. 1 device;

Fig. 4 is a fragmentary transverse section taken on line 4—4 of Fig. 1;

Fig. 5 is a fragmentary view of the cam mechanism, taken on line 5—5 of Fig. 4, and showing the cam elements in their open shutter condition;

Fig. 6 is a view corresponding to Fig. 5, but showing the cam elements in their closed shutter positions;

Fig. 7 is a front view of the fan device, showing the shutter in its open position;

Fig. 8 is a view corresponding to Fig. 7, but showing the shutter in closed position; and Fig. 9 is a fragmentary view similar to Fig. 2, but showing a variational form of fluid pressure responsive actuating element.

In Figs. 1 to 8, I have shown a preferred form of fluid displacement rotor mechanism 10 embodying the invention, which mechanism may be utilized either as a fluid moving unit such as a fan, or as a turbine or windmill type of vaned structure adapted to be rotatively driven by a flow of moving fluid. The particular form of the invention which is illustrated in the drawings is in certain respects especially desirable for use as an engine cooling fan, for drawing air rearwardly through the water cooling radiator of an internal combustion engine, and will therefore be referred to hereinafter as a fan.

The variable flow fan assembly 10 includes a rear vaned fan section 11 carried by and rotatable with the usual fan driving hub 12 of the engine, and a forward rotatable shutter section 13 mounted for rotation with and relative to the rear section. Fan section 11 carries an axially movable cam element 14, which co-acts with an annular cam plate or ring 15 carried by the shutter section 13 to relatively rotatively adjust section 13 relative to section 11 as a result of axial movement of cam element 14. The cam element 14 is actuable axially by expansion of a fluid pressure operated bladder element 16, to which pressure fluid is fed from a stationary line 17 through a rotary or swivel seal assembly 18 at the center of the device. Hub 12 is carried by the usual fan driving shaft 19, which is driven by the engine through a V-belt 20.

Each of the two sections 11 and 13 of the rotor device is formed essentially of a number of circular or annular rigid parts, designed especially for facility of manufacture and assembly. The rear vaned section, for instance, includes a circular mounting plate 21 attachable to the forward end of the driving hub 12, a cylindrical mounting ring or plate 22, a circular inner cam carrying plate 23, and an outer circular and essentially annular vaned plate 24. Mounting plate 21 has a central rearwardly facing circular recess 25 formed to receive driving hub 11, and attachable to that hub by bolts 26 threadedly connectible into a shaft carried flange member 27. It is contemplated that the formation of this attaching plate 21 may be varied to permit attachment of the device to driving hubs of various designs while the rest of the mechanism remains unchanged. Element 21 extends radially outwardly from its central recessed attaching portion 25, and then axially at an outer location to form a cylindrical outer mounting portion 28 to which the rest of the fan device may be attached as a unit. To permit such attachment, cylindrical bracket plate 22 is receivable about the outer cylindrical portion 28 of the mounting element 21, and contains a number of peripheral spaced openings 29 registering with corresponding threaded openings in the mounting element 21 and through which screws 30 extend to connect to element 21 and thus rigidly attach the fan to that element.

The outer vaned annular member 24 of section 11 comprises an essentially annular piece of sheet metal extending radially outwardly with respect to the main axis $a$ of the device. As best seen in Figures 1, 3, 7 and 8, this annular part 24 is cut and deformed at angularly spaced locations to form a series of spaced fan blades or vanes 31 extending angularly to the rear and acting to induce a rearward flow of air through the device when rotated. Preferably, the area of the material deformed to form each of these vanes 31 is the same as the areas of each of the undeformed circularly intermediate shutter surfaces 32 formed by the material of element 24 which is between the vanes. For best results, both the shutter surfaces 32 and the intermediate deformed areas from which vanes 31 are formed have the shape of truncated segments of a circle, with the circular extent of each of these segments being equal, each typically being 22½ degrees where eight vanes are provided. Vaned element 24 is rigidly attached in any suitable manner to cylindrical mounting ring 22, as by welding the parts together at 32, and along the inner edges of the vanes 31 at 33.

At the outer edge of each of the shutter surfaces 32, the plate 24 may carry a spacer, typically a spacing roller 34 which is engageable within an annularly recessed portion 35 of the main sheet metal member 36 of shutter section 13, to hold the radially outer portions of the fan and shutter sections 11 and 13 in the illustrated spaced relation. Rollers 34 may be rotatably mounted to element 24 by means of individual U-shaped mounting brackets 37, which are suitably welded or otherwise attached to element 24, and between whose spaced parallel arms the rollers 34 are rotatably carried. Each roller 34 may have a pair of projections at its opposite sides receivable within small indentations in the arms of U-shaped member 37, to mount rollers 34 for the desired rotary movement relative to members 37, and about axes which extend directly radially outwardly with respect to axis $a$ of the device. The spaced arms of each U-shaped member 37 may be resilient and tend to move relatively together, to effectively hold the associated roller 34 between its arms. The material of element 24 may be suitably deformed as at 38 or 39, to present small ribs or corrugations acting to strengthen the material of member 24.

The inner circular part 23 of the fan section 11 is formed separately in order that it may be detached from the rest of the apparatus. This circular member 23 is attached to an inner portion of vaned element 24 by a number of circularly spaced screws 40. Inwardly of its point of attachment to member 24 by screws 40, member 23 forms an annular forwardly facing recess 41, which may be of essentially rectangular section as shown, and which contains the annular hollow actuating tube or bladder 16. Bladder 16, which is formed of an elastic fluid-tight material such as rubber, normally has the transverse sectional configuration represented in Figure 2, and is adapted to be expanded by pressure fluid to the axially extended sectional configuration represented in Figure 1. Pressure fluid, such as oil under pressure from the lubricating system of the engine, is fed to bladder 16 through a line 42 extending radially outwardly between elements 21 and 23. Line 42 is connected to bladder 16 by means of a suitable fitting 43, which is threadedly connected to a tube 44, which is in turn vulcanized or otherwise permanently attached or bonded to bladder 16 within an inlet opening therein.

The radially inner end of line 42 is connected by means of a fitting 45 to a central opening 46 in plate 23, to receive fluid under pressure from the opposed inner end of the previously mentioned line 17 through seal structure 18. This seal structure may include a stationary member 47, into which line 17 is connected, and which is retained against rotation with the fan by virtue of the connection to line 17. This stationary member 47 has an annular flange portion 48, which is rotatively and annularly engaged by a sealing ring 49, which may be formed of carbon and is yieldingly urged axially against flange 48 by a coil spring 50. A rubber O-ring 51 may be provided for forming a seal annularly between ring 49 and a cylindrical bore wall 52 formed in member 23. The opposite ends of coil spring 50 may bear against a pair of washer like rings 53 and 54. As will be understood, the carbon ring 49 and O-ring 51 normally turn with fan section 10, and the engagement of ring 49 with element 47 serves to form the desired swivel or rotary type seal. Thus, pressure fluid fed to the device through line 17 can flow only to bladder 16. Fluid feed line 17 is in some manner positively held against rotation, as by rigid attachment to a stationary support member typically represented at 55. Pressure fluid may be fed to the device through line 17 from the engine lubricant pump represented at 56 and under the control of a thermostatically controlled valve 57 which is responsive to changes in the temperature of the cooling water within the radiator 58 which is being cooled by the fan device.

The stationary member 47 may be centered within the rotating fan mechanism by means of an inner ball bearing assembly 59, the outer race of which is received within an annular member 60 which is suitably attached to element 23 of the fan section, as by a number of circularly spaced screws 61. This ball bearing assembly 59, and an outer ball bearing assembly 62 for rotatably mounting shutter section 13, may both be retained against axial displacement from assembly 60 by means of a pair of retaining rings 63 and 64 attached by screws 65 to member 60.

The main sheet metal part 36 of forward shutter section 13 extends radially in very closely spaced relation to vaned element 24 of the fan section 11. Plate 36 has a number of evenly circularly spaced apertures 66, between which the plate forms intermediate shutter portions 67 of plate 36. These apertures 66 and shutter areas 67 are desirably of equal circular extent, and of a circular extent and configuration corresponding substantially to the shutter areas 32 of fan element 24, and the apertures resulting from the formation of vanes 31 in element 24. More specifically, apertures 66 and shutter areas 67 may take the form of truncated segments of a circle, each typically being 22½ degrees in circular extent where eight vanes are provided.

With the two sections 11 and 13 in the relative angular positions of Figure 8, shutter areas 32 of the rear vaned section extend across apertures 66 of the forward section 13, to close those apertures and preclude the passage of any substantial amount of air axially through the device. This Figure 8 position is therefore the fully closed position of the device. When, however, the sections 11 and 13 are relatively rotated to a condition in which shutter surfaces 32 are immediately opposite shutter surfaces 67 (see Figure 7), and vanes 31 of the rear section are positioned axially opposite apertures 66 of the forward section, the vanes are exposed and free to draw air axially through apertures 66. This, then, is the fully opened condition of the device. As will be understood, when shutter section 13 is in a position between the fully opened Figure 7 and the fully closed Figure 8 positions, relative to vaned section 11, the apparatus is partially open and acts to draw some air through the device, but not as much as in the fully opened position of Figure 7.

Shutter section 13 is rotatively actuated relative to section 11 between the Figures 7 and 8 positions by axial movement of several (preferably three) evenly circularly spaced cam elements 14. These elements 14 may comprise three rollers 14 which are mounted to individual U-shaped carriers 68 for individual rotation about three circularly spaced axes extending directly radially outwardly from the main axis *a* of the apparatus. For thus mounting rollers 14, each of these rollers may have a shaft portion 69, the outer end of which is tapered or pointed as shown and received within a correspondingly tapered recess in one of the arms of member 68. The inner end of shaft 69 may be similarly tapered and received within a recess in a screw 69 threadedly connected into the other arm of member 68.

The three roller carriers 68 are attached by screws 70 to evenly circularly spaced portions of an annular member 71 of U-shaped cross section. This member 71 is free for axial movement within recess 41 between the Figure 1 and Figure 2 positions, being actuable from the latter position to the former position by expansion of fluid pressure operated bladder 16. Ring 17 is rotatively keyed to the fan section 11, by means of three circularly spaced screws 72 connected into ring 71 and received within axially extending slots 73 in the outer wall of recess 41. This pin and slot connection 71 and 73 also serves to limit the axial movement of element 71 relative to member 23 and the rest of the fan section.

Cam rollers 14 act against an annular cam ring 15 which is attached by screws 74 to shutter element 36 and an inner ring 75 forming an additional portion of the shutter section. This ring 75 extends inwardly to co-act with element 36 in embracing the outer race of shutter mounting bearing assembly 62.

Cam ring 15 has three evenly circularly spaced cam surfaces 76 formed on it for engagement by the three cam rollers 15 respectively. As seen best in Figures 5 and 6, these cam surfaces face axially toward the rollers, and are so shaped as to advance axially as they extend circularly about the main axis *a*. Stop shoulders 77 are formed at opposite ends of cam surfaces 76, for limiting the angular displacement of shutter section 13 relative to vaned section 11.

In the normal unexpanded condition of bladder 16 (Figure 2), cam rollers 14 are in the retracted positions represented in Figure 5, and the shutter is in its Figure 7 open position relative to fan section 11. In this condition of the shutter, the fan vanes 31 act to draw air through shutter apertures 66. If pressure fluid is then fed to bladder 16 through lines 17 and 42, the bladder expands to its Figure 1 position, to actuate cam rollers 14 axially to the position represented in Figure 6. Such axial movement of rollers 14 acts to cam shutter section 13 circularly through 22½ degrees, where eight vanes are provided, by virtue of the camming action of the inclined roller engaged surfaces 76, to thus shift shutter section 13 to the Figure 8 fully closed position relative to vaned section 11. In this condition, the shutter surfaces 32 and 67 are in complementary positions, and shut off substantially all axial flow of fluid through the device. When the fluid pressure within bladder 16 is subsequently released, as by actuating valve 57 to close off the supply of fluid from pump 56 and to allow an automatic bleed-off through a line 78, bladder 16 resiliently returns to its Figure 2 position, and the other parts are returned to their Figure 2 positions by means of a flat coil spring 79 which is attached at one end to element 23 and at the other end to ring 75. This coil spring extends annularly within a space between the parts 23 and 75 to which its ends are attached. If it is desired to actuate shutter section 13 to a position intermediate the Figure 7 and Figure 8 positions, pressure fluid is supplied to bladder 16 at a pressure which is just sufficient to actuate the shutter to the desired intermediate position. As will be understood, temperature responsive control valve 57 may be so designed as to regulate the fluid pressure to actuate shutter section 13 to any of an infinite number of different positions within its permitted range of movement relative to fan section 11, to thus attain a continuous adjustment of the rate of air flow through the device. Where the rotor device comprises a fan for drawing air through an engine cooling radiator as represented at 58, the automatic regulation of the oil pressure fed to bladder 16 from pump 56, under the control of valve 57 which is responsive to the water temperature within the radiator, serves to automatically control the rate at which air is drawn through the radiator by the fan assembly, to thus vary the cooling effect on the radiator water in accordance with the requirements for such cooling encountered under different operating conditions.

Figure 9 represents fragmentarily a variational form of the invention, which is identical with that of the other figures except for the substitution of an axially expansible fluid tight annular bellows 16a for the elastic bladder 16 of the first form of the invention. As will be apparent from the drawing, this bellows 16a has inner and outer annular walls which are rendered axially flexible by forming them with a number of annular corrugations. Axial expansion of the bellows of course serves to actuate the cam parts in the same manner as does axial expansion of bladder 16 in Figures 1 to 9. Where a bellows is utilized in place of the bladder 16, the bellows may have sufficient rigidity or stiffness to hold its shape and perform the camming function without being confined and supported within a guiding recess such as that shown at 41 in Fig. 1.

When the shutter is in closed condition, the fan ceases to draw cooling air rearwardly through the radiator 58, and instead sets up a secondary circulation of air within the engine compartment. Specifically, when the shutter is closed, the fan commences to operate as a centrifugal impeller, which draws warm air forwardly from over the engine to the radially inner portions of vanes 31, which vanes then discharge the air radially outwardly. The air thus set in motion circulates about the engine, and some of the radially outwardly impelled air may be deflected forwardly by a suitable shroud 131 toward the radiator to keep it warm. The details of such a secondary circulation system are described more fully and claimed in my copending application No. 217,253, filed March 23, 1951, on "Fluid Circulation Systems" which issued as Patent No. 2,729,202 on January 3, 1956.

I claim:

1. A fluid displacement rotor assembly comprising a first section rotatable about an axis and having angular fluid displacement vanes, a shutter section rotatable with the first section and adapted to be adjusted relative to the first section and by said adjustment to vary the rate of fluid flow past said vanes, first means movable axially relative to one of said sections and operable by said movement to control the relative adjusting movement of said sections, and actuating means operable to move said first means axially to thereby adjust the sections while the sections are turning, said first means and said actuating means being free of any element tending to move by centrifugal force in a direction for axially shifting said first means and thereby effecting a change in the relative positions of said sections.

2. A fluid displacement rotor assembly as recited in claim 1 in which said sections are adjustable by relative rotation about said axis, and said first means act to releasably hold said sections in one relative rotary position.

3. A fluid displacement rotor assembly as recited in claim 1 in which said first means comprise an axially movable cam part, there being means forming a surface engaged by said part for relatively camming the sections in response to movement of said part.

4. A fluid displacement rotor assembly as recited in claim 1 in which said actuating means are operated by pressure fluid.

5. A fluid displacement rotor assembly as recited in claim 1 in which said sections are adjustable by relative rotation about said axis, said first means comprising a cam element rotating with one of said sections and movable axially relative thereto, there being a surface on the other section engaged by said cam element for effecting relative rotary adjusting movement of the sections in response to axial movement of the cam element, and said operating means comprising a fluid actuated unit rotating with said sections and acting to actuate said cam element axially.

6. A fluid displacement rotor assembly as recited in claim 5 in which said fluid actuated unit comprises a hollow essentially annular elastically expansible body centered about said axis and turning thereabout with said sections.

7. A fluid displacement rotor assembly as recited in claim 6 in which said cam element comprises a roller mounted for rotation about an axis extending radially outwardly from said first mentioned axis.

8. A fluid displacement rotor assembly comprising a first section rotatable about an axis and having angular fluid displacement vanes, a shutter section rotatable with the first section and adapted to be adjusted relative to the first section and by said adjustment to vary the rate of fluid flow past said vanes, a cam element rotating with one of the sections and movable relative thereto, and means forming a surface associated with the other section engageable with said cam element and operable to cam said sections between two different relative positions in response to movement of the cam element.

9. A fluid displacement rotor assembly as recited in claim 8 in which said sections are relatively adjustable by rotary movement about said axis, and said cam element moves axially to adjust the sections.

10. A fluid displacement rotor assembly as recited in claim 9 including means for actuating said cam element axially while the sections are turning.

11. A fluid displacement rotor assembly as recited in claim 9 including means for actuating said cam element while the sections are turning and in a direction for relatively rotatively actuating said sections in a first rotary direction, and a return spring for actuating said sections in a reverse rotary direction upon release of said cam element.

12. A fluid displacement rotor assembly as recited in claim 9 in which said cam element comprises a roller mounted for rotation about an axis extending radially outwardly from said first mentioned axis, said control mechanism including a carrier member rotatably carrying said roller and bodily movable parallel to said first axis, and means for actuating said carrier member and roller in the direction of said first axis while the sections are turning.

13. A fluid displacement rotor assembly comprising a first section rotatable about an axis and having angular fluid displacement vanes, a shutter section rotatable with the first section about said axis and rotatably adjustable relative thereto about said axis to vary the rate of fluid flow past the vanes, and control mechanism operable to rotatively actuate one of said sections about said axis relative to the other in either of two opposite rotary directions and between two different relative rotary positions.

14. A fluid displacement rotor assembly as recited in claim 13 in which said control mechanism comprises first means for actuating said one section in one of said rotary directions relative to the other section and between said positions, and a return spring operable to return said one section in the other rotary direction upon release of said first means.

15. A fluid displacement rotor assembly comprising a first section rotatable about an axis and having angular fluid displacement vanes, a shutter section rotatable with the first section and adapted to be adjusted relative to the first section and by said adjustment to vary the rate of fluid flow past said vanes, and control mechanism rotating with said sections and operable to controllably vary the relative positions of said sections while they are turning and to thereby vary the rate of fluid flow past said vanes, said control mechanism being actuable by pressure fluid.

16. A fluid displacement rotor assembly as recited in 15 in which said fluid actuated control mechanism includes a hollow elastically expensible element actuable by said pressure fluid, and means actuated by said expansible element for causing relative shifting movement of said sections.

17. A fluid displacement rotor assembly as recited in 16 in which said sections are adjusted by relative rotary motion about the axis of the sections, and said hollow expansible element is essentially annular and centered about said axis.

18. A fluid displacement rotor assembly comprising a first section rotatable about an axis and having angular fluid displacement vanes, a shutter section rotatable with the first section about said axis and rotatively adjustable about said axis to vary the rate of fluid flow past the vanes, and control mechanism operable to hold one of the sections in any of an infinite number of rotary positions relative to the other section within a predetermined range of movement, said mechanism being adapted for actuation to relatively shift the sections while the sections are turning.

References Cited in the file of this patent

UNITED STATES PATENTS

| | | |
|---|---|---|
| 1,585,091 | Galli | May 18, 1926 |
| 1,871,733 | Petersen | Aug. 16, 1932 |
| 1,925,352 | Twombly | Sept. 5, 1933 |
| 2,626,743 | Sanders | Jan. 27, 1953 |
| 2,626,744 | Sanders | Jan. 27, 1953 |